United States Patent
Liu et al.

(10) Patent No.: US 9,776,294 B2
(45) Date of Patent: Oct. 3, 2017

(54) APPARATUS FOR KEEPING A FRICTION ROLLER

(71) Applicants: Boe Technology Group Co., Ltd., Beijing (CN); Heifi Xinsheng Optoelectronics Technology Co., Ltd., Anhui (CN)

(72) Inventors: Laifeng Liu, Beijing (CN); Zhubing Huang, Beijing (CN); Hui Jing, Beijing (CN); Xiaofeng Wang, Beijing (CN); Qiang Xiang, Beijing (CN)

(73) Assignees: BOE TECHNOLOGY GROUP CO., LTD., Beijing (CN); HEFEI XINSHENG OPTOELECTRONICS TECHNOLOGY CO., LTD.

( * ) Notice: Subject to any disclaimer, the term of this patent is extended or adjusted under 35 U.S.C. 154(b) by 203 days.

(21) Appl. No.: 14/744,239

(22) Filed: Jun. 19, 2015

(65) Prior Publication Data

US 2016/0143436 A1   May 26, 2016

(30) Foreign Application Priority Data

Nov. 24, 2014 (CN) .......................... 2014 1 0686540

(51) Int. Cl.
B23Q 3/157       (2006.01)
A47B 49/00      (2006.01)
(Continued)

(52) U.S. Cl.
CPC .......... B23Q 3/1572 (2013.01); A47B 49/008 (2013.01); B65G 1/02 (2013.01);
(Continued)

(58) Field of Classification Search
CPC . Y10T 483/10; Y10T 483/13; Y10T 483/138; Y10T 483/1783; Y10T 483/1786;
(Continued)

(56) References Cited

U.S. PATENT DOCUMENTS 3,187,123 A * 6/1965 Anthony ............ B23Q 3/15546
                                                                200/43.06
3,657,627 A * 4/1972 Inaba ................. B23Q 3/15546
                                                                318/601
(Continued)

FOREIGN PATENT DOCUMENTS

CN    201942242    8/2011
CN    203740596    7/2014
(Continued)

OTHER PUBLICATIONS

Office action from Chinese Application No. 201410686540.X dated Feb. 19, 2016.

*Primary Examiner* — Sunil K Singh
*Assistant Examiner* — Michael Vitale
(74) *Attorney, Agent, or Firm* — Calfee, Halter & Griswold LLP (57) ABSTRACT

The disclosure relates to an apparatus for keeping a friction roller. The apparatus for keeping a friction roller comprises a cylinder provided with a plurality of brackets for storing the friction roller, a friction roller pick-and-place execution unit for picking and placing the friction roller, a cylinder driving unit for driving the cylinder to rotate, a storage sensor unit for sensing whether a friction roller exists on a bracket, a pick-and-place position sensor unit for sensing whether a bracket arrives at a pick-and-place position of the friction roller, and a control unit. The apparatus for keeping a friction roller according to the disclosure may access more friction rollers accurately; and the stroke of the action of picking and placing a friction roller is relatively short, such that the work efficiency of picking and placing a friction roller is also increased very greatly.

12 Claims, 4 Drawing Sheets

(51) Int. Cl.
 *B65G 1/02* (2006.01)
 *G02F 1/13* (2006.01)
 *B23Q 3/155* (2006.01)

(52) U.S. Cl.
 CPC ........ *G02F 1/1303* (2013.01); *B23Q 3/15546* (2013.01); *Y10T 483/10* (2015.01); *Y10T 483/13* (2015.01); *Y10T 483/1786* (2015.01); *Y10T 483/1873* (2015.01)

(58) Field of Classification Search
 CPC ......... Y10T 483/1788; Y10T 483/1873; Y10T 483/1882; B23Q 3/15546; B23Q 3/1572; B23Q 3/15722; B23Q 3/15724
 USPC .............. 483/1, 7, 10, 11, 51, 52, 53, 66, 67
 See application file for complete search history.

(56) References Cited

U.S. PATENT DOCUMENTS

| | | | | |
|---|---|---|---|---|
| 4,109,188 A | * | 8/1978 | Shima | G05B 19/182 318/602 |
| 5,065,905 A | | 11/1991 | Eddy et al. | |
| 5,304,110 A | * | 4/1994 | Obrist | B23Q 3/15526 211/1.55 |
| 6,024,681 A | * | 2/2000 | Latten | B21D 5/02 483/29 |

FOREIGN PATENT DOCUMENTS

| | | | | |
|---|---|---|---|---|
| DE | 2609337 A1 | * | 9/1977 | ......... B23Q 3/15546 |
| GB | 2199022 | | 1/1991 | |
| JP | 62044337 A | * | 2/1987 | ........... B23Q 3/1574 |
| TW | 561520 | | 11/2003 | |

\* cited by examiner

APPARATUS FOR KEEPING A FRICTION ROLLER

RELATED APPLICATIONS

The present application claims the benefit of Chinese Patent Application No. 201410686540.X, filed Nov. 24, 2014, the entire disclosure of which is incorporated herein by reference.

FIELD OF THE INVENTION

The disclosure relates to the field of liquid crystal manufacturing device storage, and in particular, to an apparatus for keeping a friction roller.

BACKGROUND OF THE INVENTION

With the development of the TFT-LCD industry and the product technology being increasingly updated, the requirements for the friction process are also higher and higher. The friction process refers to rubbing a glass substrate by a friction roller, to cause an alignment film on the glass substrate to have the ability of aligning liquid crystal molecules, such that the liquid crystal molecules have a desired inclination angle. In the friction process, the quality of a friction roller is crucial to the product quality. On the surface of the friction roller is glued a layer of cloth with a double-sided adhesive, which is called friction cloth. For the friction process, each piece of friction cloth has a lifetime, and therefore the storage of the friction roller is a relatively complicated task.

Figure 1:
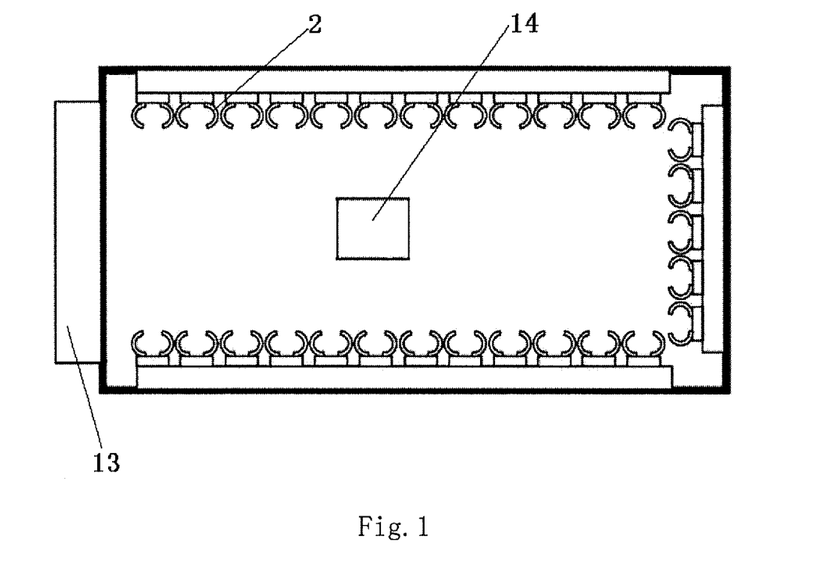
FIG. 1 is a schematic diagram of a structure for storing a friction roller in the prior art.

FIG. 1 shows a schematic diagram of a structure for storing a friction roller in the prior art. As shown in FIG. 1, a way of storing a friction roller in the prior art is that a pre-stored friction roller is placed in a friction roller feeding area 13, a plurality of brackets 2 are fixed at a position to the side of a store, and a friction roller pick-and-place execution mechanism 14 is disposed in the middle of the store, and picks and places a friction roller from the plurality of brackets 2. However, the number of friction rollers stored by the above-mentioned way of storing a friction roller in the prior art is limited, and since the stroke of the action of the friction roller pick-and-place execution mechanism 14 is long, the work efficiency of the whole friction roller storage device is caused to be low.

SUMMARY OF THE INVENTION

Technical Problems to be Resolved

Therefore, with regard to the above defects and deficiencies in the prior art, the disclosure provides an apparatus for keeping a friction roller to solve the problems of a limited storage quantity and a low work efficiency existing in the structure for storing a friction roller in the prior art.

Technical Solutions

The apparatus for keeping a friction roller provided by the disclosure comprises: a cylinder provided with a plurality of brackets for storing the friction roller, a friction roller pick-and-place execution unit for picking and placing the friction roller, a cylinder driving unit for driving the cylinder to rotate, a storage sensor unit for sensing whether a friction roller exists on a bracket, a pick-and-place position sensor unit for sensing whether a bracket arrives at a pick-and-place position of the friction roller, and a control unit, wherein the friction roller pick-and-place execution unit is disposed at a position close to the cylinder; the cylinder comprises a fixed part and a rotating part, the rotating part is connected with the cylinder driving unit, the plurality of brackets are juxtaposed at the periphery of the rotating part of the cylinder, the storage sensor unit is disposed on the fixed part of the cylinder and corresponds to a position storing the friction roller on a bracket, and the pick-and-place position sensor unit is disposed at a position on the fixed part of the cylinder close to the friction roller pick-and-place execution unit; and the friction roller pick-and-place execution unit, the storage sensor unit, the pick-and-place position sensor unit and the cylinder driving unit are all connected with the control unit.

In an embodiment of the apparatus for keeping a friction roller according to the disclosure, the apparatus for keeping a friction roller further comprises an origin position sensor unit disposed at a position on the fixed part of the cylinder close to the friction roller pick-and-place execution unit, which position is called the cylinder origin position.

In an embodiment of the apparatus for keeping a friction roller according to the disclosure, the fixed part of the cylinder comprises two placement platforms disposed at both ends of the rotating part of the cylinder.

In an embodiment of the apparatus for keeping a friction roller according to the disclosure, the storage sensor unit comprises a plurality of pairs of first sensors uniformly distributed on the placement platforms, and individual pairs of first sensors are oppositely placed on the two placement platforms at both ends of the rotating part of the cylinder respectively.

In an embodiment of the apparatus for keeping a friction roller according to the disclosure, the pick-and-place position sensor unit comprises a pair of second sensors disposed at the periphery of the placement platforms, and the pair of second sensors is oppositely placed on the two placement platforms at both ends of the rotating part of the cylinder respectively.

In an embodiment of the apparatus for keeping a friction roller according to the disclosure, the origin position sensor unit comprises a pair of third sensors disposed at the periphery of the placement platforms, and the pair of third sensors is oppositely placed on the two placement platforms at both ends of the rotating part of the cylinder respectively.

In an embodiment of the apparatus for keeping a friction roller according to the disclosure, the brackets have a first through-hole for use with the pair of second sensors and a second through-hole for use with the pair of third sensors.

In an embodiment of the apparatus for keeping a friction roller according to the disclosure, the brackets are disposed at an acute angle with respect to the axis of the cylinder, such that the rotation is more stationary.

In an embodiment of the apparatus for keeping a friction roller according to the disclosure, the cylinder driving unit comprises a driving motor and a transmission belt, wherein the rotating part of the cylinder is connected with the driving motor via the transmission belt, such that the driving motor drives the rotating part of the cylinder to rotate through the transmission belt.

In an embodiment of the apparatus for keeping a friction roller according to the disclosure, there are further comprised a store and a traveling track disposed in the middle of the store, wherein the friction roller pick-and-place execution unit is disposed on the traveling track and a plurality of the cylinders are disposed around the traveling track.

In an embodiment of the apparatus for keeping a friction roller according to the disclosure, there is further comprised a bar code scanner which is connected with the control unit.

According to another aspect of the disclosure, there is provided a method for depositing a friction roller in an apparatus for keeping a friction roller according to the above embodiments of the disclosure, which comprises the following steps of:

the pre-stored friction roller being placed in the friction roller feeding area, the bar code scanner reading the bar code on the friction roller and transmitting the information to the control unit;

inputting information on positions of the cylinder where the friction roller is pre-placed and the brackets on the cylinder in the control unit;

the control unit controlling the cylinder driving unit to drive the rotating part of the cylinder according to the information on the positions of the pre-placing brackets, and causing the pre-placing brackets to rotate to a pick-and-place position by means of the pick-and-place position sensor unit, and the friction roller pick-and-place execution unit taking out the friction roller from the friction roller feeding area and placing on a corresponding bracket in the cylinder; and the control unit controlling the cylinder driving unit to drive the brackets, and causing the specified bracket to rotate back to the cylinder origin position by means of the origin position sensor unit.

According to yet another aspect of the disclosure, there is provided a method for taking out a friction roller in an apparatus for keeping a friction roller according to the embodiments of the disclosure, which comprises the following steps of:

inputting the bar code of a friction roller to be taken out in the control unit;

the control unit controlling the cylinder driving unit to drive the rotating part of the cylinder and causing a bracket where a friction roller corresponding to the bar code is located to rotate to a pick-and-place position by means of the pick-and-place position sensor unit;

the friction roller pick-and-place execution unit taking down the friction roller on the corresponding bracket and placing it in the friction roller feeding area, and the bar code scanner reading the bar code on the friction roller to confirm its identity; and the control unit controlling the cylinder driving unit to drive the brackets, and causing the specified bracket to rotate back to the cylinder origin position by means of the origin position sensor unit.

Beneficial Effects

The above technical solutions of the disclosure have the following advantages: in the apparatus for keeping a friction roller provided by the disclosure, a plurality of brackets are juxtaposed at the periphery of the rotating part of the cylinder for storing the friction roller, the storage sensor unit and the pick-and-place position sensor unit are disposed on the fixed part of the cylinder and thus may respectively ascertain whether a friction roller exists on the brackets and whether a bracket where the friction roller is located arrives at a pick-and-place position and pass such information to the control unit, and in turn, the friction roller pick-and-place execution unit accesses the friction roller under the control of the control unit, such that more friction rollers may be accessed accurately, and the number of the stored friction rollers is increased very greatly; and since the friction roller pick-and-place execution unit is disposed at a position close to the cylinder, the stroke of its pick-and-place action is relatively short, and thereby the work efficiency of picking and placing a friction roller is also increased very greatly.

In the figures, 1 denotes cylinder; 2 bracket; 3 first sensor; 4 placement platform; 5 traveling track; 6 first through-hole; 7 second sensor; 8 cylinder origin position; 9 second through-hole; 10 third sensor; 11 driving motor; 12 transmission belt; 13 friction roller feeding area; 14 friction roller pick-and-place execution unit; 15 store.

DETAILED DESCRIPTION OF THE INVENTION

In the following particular implementations of the disclosure will be further described in detail in connection with the drawings and the embodiments. The following embodiments are used for illustrating the disclosure, but not limiting the scope of the disclosure.

Figure 2:
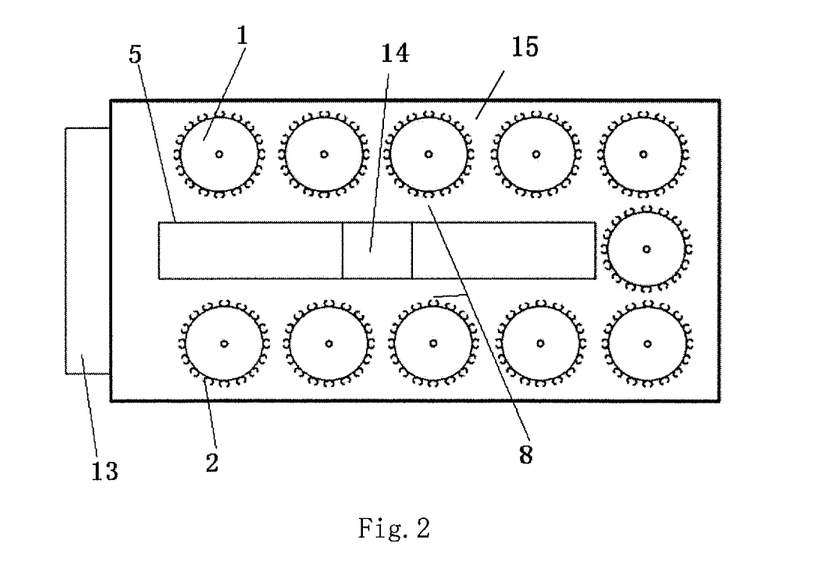
FIG. 2 is a schematic plan view of an apparatus for keeping a friction roller according to an embodiment of the disclosure.

FIG. 2 shows a schematic plan view of an apparatus for keeping a friction roller according to an embodiment of the disclosure. As shown in FIG. 2, the apparatus for keeping a friction roller according to an embodiment of the disclosure comprises a cylinder 1, a friction roller pick-and-place execution unit 14, and besides, further comprises a control unit, a cylinder driving unit, a storage sensor unit and a pick-and-place position sensor unit not shown in the figure. In the apparatus for keeping a friction roller shown in FIG. 2, a plurality of brackets 2 for storing a friction roller are disposed at the periphery of the cylinder 1, and the friction roller pick-and-place execution unit 14 is disposed at a position close to the cylinder 1 for picking and placing a friction roller from/to a bracket 2.

Further, as shown in FIG. 2, the apparatus for keeping a friction roller according to an embodiment of the disclosure may further comprise a store 15 and a traveling track 5 disposed in the middle of the store 15, and a plurality of the cylinders 1 may be disposed around the traveling track 5.

The friction roller pick-and-place execution unit 14 may be disposed on the traveling track 5 and slide thereon, and thereby may be close to an individual cylinder 1 for accessing a friction roller.

In addition, as shown in FIG. 2, the end of the traveling track 5 close to the inlet of the store 15 is a friction roller feeding area 13. In the friction roller feeding area 13, a bar code scanner may be disposed, which is connected with the control unit. Thus, the bar code scanner may read information on a bar code stuck on a pre-stored friction roller and pass the information to the control unit, such that a storage position of the friction roller in the store 15 may be traced.

Figure 3:
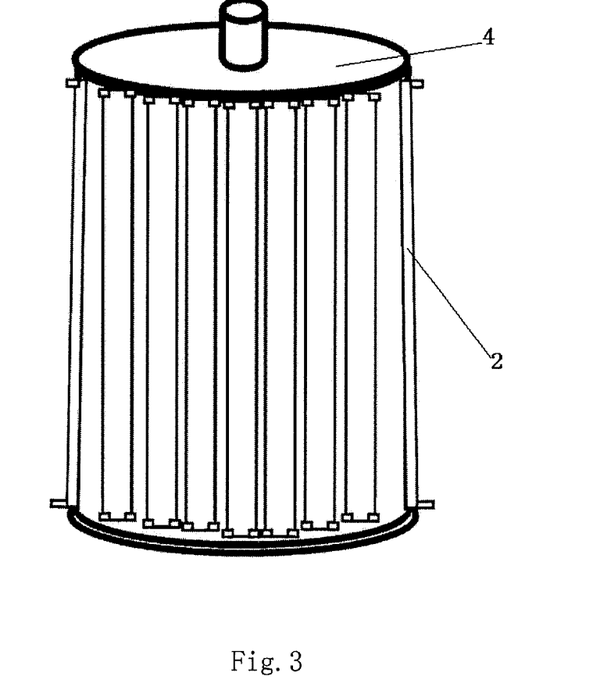
FIG. 3 is a three-dimensional structural schematic diagram of the cylinder in the apparatus for keeping a friction roller according to an embodiment of the disclosure.
Figure 4:
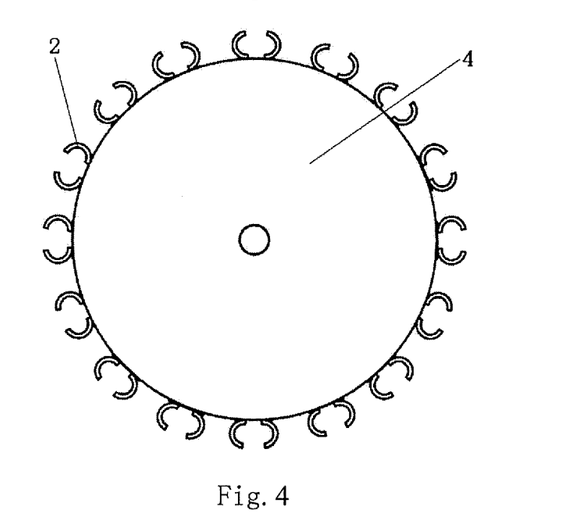
FIG. 4 is a schematic plan view of the cylinder in the apparatus for keeping a friction roller according to an embodiment of the disclosure.

FIG. 3 and FIG. 4 respectively show a three-dimensional structural schematic diagram and a schematic plan view of the cylinder in the apparatus for keeping a friction roller according to an embodiment of the disclosure. The cylinder 1 comprises a fixed part and a rotating part, wherein as shown in FIG. 3 and FIG. 4, the rotating part may be the plurality of brackets 2 for storing a friction roller disposed at the periphery of the cylinder 1, and is driven by the cylinder driving unit connected with it, whereas the fixed part is particularly two placement platforms 4 disposed at both ends of the rotating part of the cylinder 1 respectively. Additionally, the storage sensor unit is disposed on the placement platforms 4 at both ends of the cylinder 1 and corresponds to a position on a bracket 2 storing a friction roller for sensing whether a friction roller exists on the bracket 2; the pick-and-place position sensor unit is disposed at a position on a placement platform 4 of the cylinder 1 close to the friction roller pick-and-place execution unit 14 as shown in FIG. 2 for sensing whether a bracket 2 where a friction roller predetermined to be accessed is located arrives at (rotates to) a friction roller pick-and-place position (i.e., a position corresponding to the pick-and-place position sensor unit); and the friction roller pick-and-place execution unit 14, the storage sensor unit, the pick-and-place position sensor unit and the cylinder driving unit are all connected with the control unit and uniformly controlled by the control unit.

In the apparatus for keeping a friction roller according to an embodiment of the disclosure, a plurality of friction rollers may be placed vertically on the plurality of brackets 2 respectively, and with the rotation of the cylinder 1, the brackets 2 may bring the friction rollers to rotate. In the work process of the apparatus for keeping a friction roller according to an embodiment of the disclosure, the storage sensor unit may sense whether a friction roller exists on a bracket 2; the pick-and-place position sensor unit may sense whether a bracket 2 where a friction roller predetermined to be accessed is located arrives at a friction roller pick-and-place position; and the control unit may control the friction roller pick-and-place execution unit 14 to perform the action of picking and placing a friction roller accordingly according to the information sensed by the two sensor units. For example, in the process of storing a friction roller to the apparatus for keeping a friction roller, when the pick-and-place position sensor unit senses that a bracket 2 where a friction roller predetermined to be accessed is located arrives at a friction roller pick-and-place position and the storage sensor unit senses that no friction roller is deposited on the bracket 2, the control unit may control the friction roller pick-and-place execution unit 14 to perform a corresponding action of storing a friction roller; while in the process of taking out a friction roller from the apparatus for keeping a friction roller, if the pick-and-place position sensor unit senses that a bracket 2 where a friction roller predetermined to be accessed is located arrives at a friction roller pick-and-place position and the storage sensor unit senses that a friction roller is deposited on the bracket 2, the control unit may control the friction roller pick-and-place execution unit 14 to perform a corresponding action of taking out a friction roller.

Figure 6:
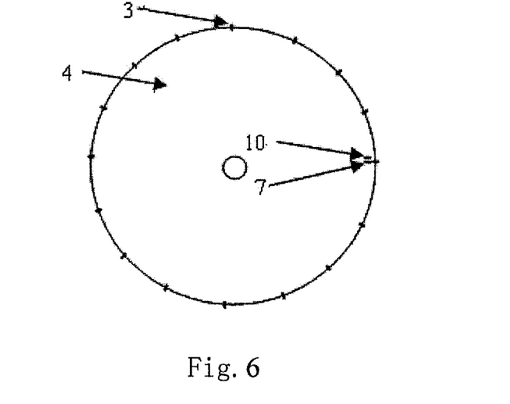
FIG. 6 is a schematic diagram of an arrangement of individual sensors on a placement platform in the apparatus for keeping a friction roller according to an embodiment of the disclosure.

FIG. 6 shows a schematic diagram of an arrangement of individual sensor units on a placement platform 4 in the apparatus for keeping a friction roller according to an embodiment of the disclosure. As shown in FIG. 6, the storage sensor unit comprises a plurality of pairs of first sensors 3 uniformly distributed on the placement platforms 4, and individual pairs of first sensors 3 are oppositely placed on the two placement platforms 4 at both ends of the rotating part of the cylinder 1 respectively. Since a pair of first sensors 3 corresponds to a position storing a friction roller on a bracket 2, the pair of first sensors 3 may sense whether a friction roller exists on the racket 2 between each other for example by the infrared shoot sensing technique and thereby pass the information to the control unit. The pick-and-place position sensor unit comprises a pair of second sensors 7 disposed at the periphery of the placement platforms 4, which are oppositely placed on the two placement platforms 4 at both ends of the rotating part of the cylinder 1 respectively.

Further, the apparatus for keeping a friction roller according to an embodiment of the disclosure may further comprise an origin position sensor unit which is disposed at a position on a placement platform 4 of the cylinder close to the friction roller pick-and-place execution unit 14. In particular, as shown in FIG. 6, the origin position sensor unit comprises a pair of third sensors 10 disposed at the periphery of the placement platforms 4, and the pair of third sensors 10 is oppositely placed on the two placement platforms 4 at both ends of the rotating part of the cylinder 1 respectively, generally disposed near the second sensors 7. Thus, the position where the origin position sensor unit (e.g., the third sensor 10) is located may be considered as the cylinder origin position (e.g., 8 as shown in FIG. 2). Thereby, taking the cylinder origin position as a reference point, the relative positions of individual brackets 2 of the cylinder 1 may be determined, thereby facilitating the access of a friction roller on a certain bracket 2.

Figure 5:
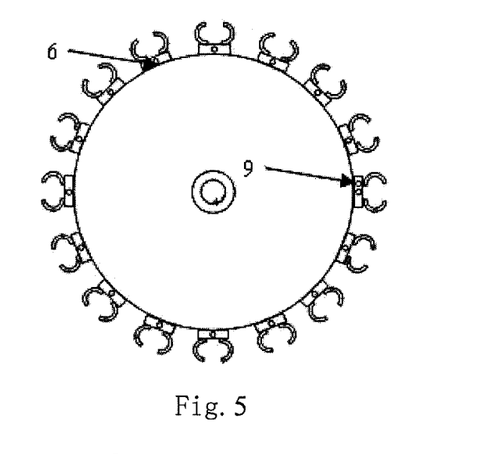
FIG. 5 is a schematic plan view after a placement platform is removed at the top of the cylinder in the apparatus for keeping a friction roller according to an embodiment of the disclosure.
Figure 7:
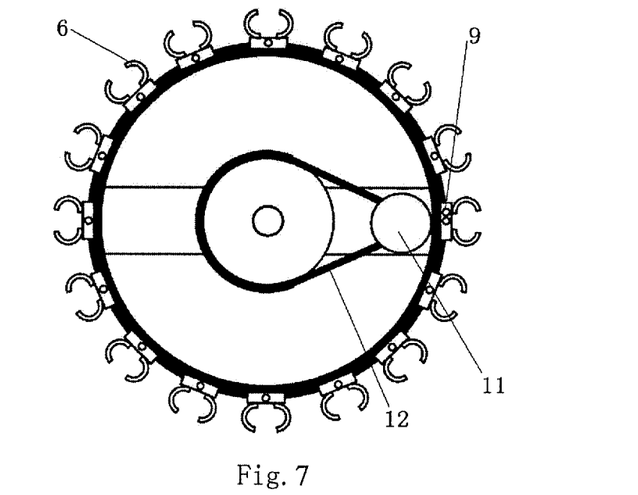
FIG. 7 is a schematic plan view after a placement platform is removed at the bottom of the cylinder in the apparatus for keeping a friction roller according to an embodiment of the disclosure.

FIG. 5 and FIG. 7 respectively show a schematic plan view after a placement platform is removed at the top and the bottom of the cylinder in the apparatus for keeping a friction roller according to an embodiment of the disclosure. As shown in FIG. 5 and FIG. 7, each bracket 2 has a first through-hole 6 for the pair of second sensors 7 to sense whether the bracket 2 is at a pick-and-place position for example by the infrared shoot sensing technique; and a specified bracket 2 has a second through-hole 9 for the pair of third sensors 10 to sense whether the specified bracket 2 is at the cylinder origin position for example by the infrared shoot sensing technique. For example, when the pair of second sensors 7 shoots via a corresponding first through-hole 6 of a bracket 2, indicating that a corresponding bracket 2 arrives at a pick-and-place position, they will transmit information that a corresponding bracket 2 arrives at a pick-and-place position; and for example when the pair of third sensors 10 shoots via a corresponding second through-hole 9, they will transmit information that the specified bracket 2 arrives at the cylinder origin position. Here, the position where the whole brackets 2 (or the rotating part of the cylinder 1) are located when the specified bracket 2 is at the cylinder origin position may be set to be an initial position, and at this point, the relative positions of all the brackets 2 may be determined, and the relative positions may be taken as the position information of the brackets 2 in the following.

Further, the brackets 2 may be disposed at an acute angle with respect to the axis of the cylinder 1, for example, the angle may be 5°. Practice shows that in the case that the brackets have a certain inclination, the cylinder will be relatively stationary when rotating, and the amount of deformation will be small after a long use.

Figure 8:
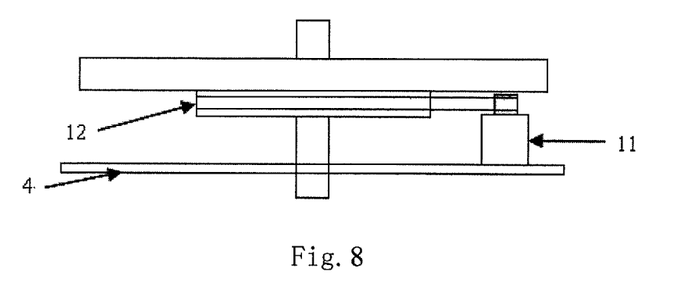
FIG. 8 is a structural schematic side view of the cylinder driving unit at the bottom of the cylinder in the apparatus for keeping a friction roller according to an embodiment of the disclosure.

FIG. 8 is a structural schematic side view of the cylinder driving unit at the bottom of the cylinder in the apparatus for keeping a friction roller according to an embodiment of the disclosure. As shown in FIG. 7 and FIG. 8, the cylinder driving unit comprises a driving motor 11 and a transmission belt 12, and the rotating part of the cylinder 1 is connected with the driving motor 11 via the transmission belt 12. The driving motor 11 is connected with the control unit. Under the driving of the driving motor 11, the rotating part of the cylinder 1 is brought to rotate via the transmission belt 12.

In the following, the working method of the above described apparatus for keeping a friction roller according to the disclosure will be discussed. Obviously, there are comprised two processes of depositing and taking out a friction roller when the apparatus for keeping a friction roller according to embodiments of the disclosure works. First, a method for depositing a friction roller may comprise the following steps:

(i). the pre-stored friction roller being placed in the friction roller feeding area 13, the bar code scanner reading the bar code on the friction roller and transmitting the information to the control unit;

(ii). inputting information on positions of the cylinder 1 where the friction roller is pre-placed and the brackets 2 on the cylinder 1 in the control unit;

(iii). the control unit controlling the cylinder driving unit to drive the rotating part of the cylinder 1 according to the information on the positions of the pre-placing brackets 2, and causing the pre-placing brackets 2 to rotate to a pick-and-place position by means of the pick-and-place position sensor unit (i.e., the second sensors), and the friction roller pick-and-place execution unit 14 taking out the friction roller from the friction roller feeding area 13 and placing on a corresponding bracket 2 in the cylinder 1; and (iv). the control unit controlling the cylinder driving unit to drive the brackets 2, and causing the specified bracket 2 to rotate back to the cylinder origin position 8 by means of the origin position sensor unit (i.e., the third sensors), i.e., the whole brackets 2 restore to the initial position.

In addition, a method for taking out a friction roller may comprise the following steps:

(i). inputting the bar code of the taken friction roller in the control unit;

(ii). the control unit controlling the cylinder driving unit to drive the rotating part of the cylinder 1 and causing a bracket 2 where a friction roller corresponding to the bar code is located to rotate to a pick-and-place position by means of the pick-and-place position sensor unit;

(iii). the friction roller pick-and-place execution unit 14 taking down the friction roller on the corresponding bracket 2 and placing it in the friction roller feeding area 13, and the bar code scanner reading the bar code on the friction roller for confirmation; and (iv). the control unit controlling the cylinder driving unit to drive the brackets 2, and causing the specified bracket 2 to rotate back to the cylinder origin position 8 by means of the origin position sensor unit (i.e., the third sensors), i.e., the whole brackets 2 restore to the initial position.

In summary, in the apparatus for keeping a friction roller provided by the disclosure, a plurality of brackets 2 are juxtaposed at the periphery of the rotating part of the cylinder 1 for storing the friction roller, the storage sensor unit and the pick-and-place position sensor unit are disposed on the placement platforms 4 at both ends of the cylinder 1 and thus may respectively sense whether a friction roller exists on the brackets 2 and whether a bracket 2 where the friction roller is located arrives at a pick-and-place position, and in turn, the friction roller pick-and-place execution unit 14 may be controlled to access the friction roller under the control of the control unit, such that more friction rollers may be accessed accurately, and the number of the stored friction rollers is increased very greatly. Further, since the friction roller pick-and-place execution unit 14 is disposed at a position close to the cylinder 1, the stroke of its action is relatively short, and thereby the work efficiency of picking and placing a friction roller is also increased very greatly. Additionally, since the capability of the store 15 of storing friction rollers is promoted, it is unnecessary to build a store once more, and thereby the production cost is also lowered.

What are described above are just preferred embodiments of the disclosure. It should be noted that for those of ordinary skills in the art, improvements and variations may be made without departing from the technical principles of the disclosure, and these improvements and variations should also be construed to fall within the protection scope of the disclosure.

The invention claimed is:

1. An apparatus for storing a plurality of friction rollers, the apparatus comprising:
    a cylinder provided with a plurality of brackets, wherein each of the plurality of brackets stores a respective one of the plurality of friction rollers at a given time,
    a friction roller pick-and-place transfer unit for picking and placing the plurality of friction rollers,
    a cylinder driving unit for driving the cylinder to rotate about an axis of rotation,
    a storage sensor unit for sensing whether one of the plurality of friction rollers is disposed within a given one of the plurality of brackets,
    a pick-and-place position sensor unit for sensing whether the given one of the plurality of brackets is indexed at a pick-and-place position for interfacing with the friction roller pick-and-place transfer unit, and
    a control unit,
    wherein the cylinder comprises a fixed part and a rotating part, the rotating part is connected with the cylinder driving unit, and the fixed part comprises two placement platforms disposed at opposing ends of the rotating part of the cylinder with respect to the direction in which the axis of rotation extends,
    the plurality of brackets are juxtaposed at the periphery of the rotating part of the cylinder,
    the storage sensor unit is disposed on the fixed part of the cylinder and corresponds to a position storing the one of the plurality of friction rollers within the given one of the plurality of brackets, and the storage sensor unit comprises a pair of first sensors, where one sensor of the pair of first sensors is disposed on a first of the two placement platforms and another sensor of the pair of first sensors is disposed on a second of the two placement platforms,
    the pick-and-place position sensor unit is disposed at a position on the fixed part of the cylinder, and the friction roller pick-and-place transfer unit, the storage sensor unit, the pick-and-place position sensor unit, and the cylinder driving unit are all connected with the control unit.

2. The apparatus for storing the plurality of friction rollers as claimed in claim 1, the apparatus further comprising:
an origin position sensor unit disposed at a cylinder origin position on the fixed part of the cylinder, wherein the origin position sensor is used for sensing whether a specified bracket of the plurality of brackets is located at the cylinder origin position.

3. The apparatus for storing the plurality of friction rollers as claimed in claim 2, wherein the storage sensor comprises a plurality of pairs of first sensors uniformly distributed on the placement platforms, and one sensor of each of the plurality of pairs of first sensors is disposed on the first of the two placement platforms and another sensor of each of the plurality of pairs of first sensors is disposed on the second of the two placement platforms.

4. The apparatus for storing the plurality of friction rollers as claimed in claim 2, wherein the pick-and-place position sensor unit comprises a pair of second sensors, and one sensor of the pair of second sensors is disposed on the periphery of the first of the two placement platforms and another sensor of the pair of second sensors is disposed on the periphery of the second of the two placement platforms.

5. The apparatus for storing the plurality of friction rollers as claimed in claim 4, wherein the origin position sensor unit comprises a pair of third sensors, and one sensor of the pair of third sensors is disposed on the periphery of the first of the two placement platforms and another sensor of the pair of third sensors is disposed on the periphery of the second of the two placement platforms.

6. The apparatus for storing the plurality of friction rollers as claimed in claim 5, wherein each of the plurality of brackets have respective first through-holes for use with the pair of second sensors, and the specified bracket further comprises second through-holes for use with the pair of third sensors.

7. The apparatus for storing the plurality of friction rollers as claimed in claim 2, the apparatus further comprising a bar code scanner, wherein the bar code scanner is connected with the control unit.

8. The apparatus for storing the plurality of friction rollers as claimed in claim 1, wherein each of the plurality of brackets is disposed at an acute angle with respect to the axis of rotation of the cylinder.

9. The apparatus for storing the plurality of friction rollers as claimed in claim 1, wherein the cylinder driving unit comprises a driving motor and a transmission belt, wherein the rotating part of the cylinder is connected with the driving motor via the transmission belt.

10. The apparatus for storing the plurality of friction rollers as claimed in claim 1, the apparatus further comprising a platform and a traveling track that is disposed in the middle of the platform, wherein the friction roller pick-and-place transfer unit is disposed on the traveling track and a plurality of the cylinders are disposed around the traveling track.

11. A method for depositing a friction roller, the method comprising:
providing the apparatus for storing the plurality of friction rollers according to claim 1;
placing the friction roller in a friction roller feeding area;
reading a bar code on the friction roller with a bar code scanner of the apparatus;
transmitting bar code information to the control unit;
inputting information on positions of the cylinder where the friction roller is able to be placed;
inputting information on the plurality of brackets on the cylinder in the control unit;
controlling the cylinder driving unit with the control unit to drive the rotating part of the cylinder according to the information on positions of the plurality of brackets;
rotating a given one of the plurality of brackets to rotate to the pick-and-place position by means of the pick-and-place position sensor unit;
controlling the friction roller pick-and-place transfer unit to take the friction roller out from the friction roller feeding area and place the friction roller on the given one of the plurality of brackets in the cylinder; and
controlling the cylinder driving unit with the control unit to drive the plurality of brackets, and cause a specified bracket of the plurality of brackets to rotate back to a cylinder origin position by means of an origin position sensor unit of the apparatus.

12. A method for taking out a friction roller, the method comprising:
providing the apparatus for storing the plurality of friction rollers according to claim 1;
inputting in the control unit a bar code of the friction roller to be taken out;
controlling the cylinder driving unit to drive the rotating part of the cylinder and cause a given one of the plurality of brackets where the friction roller corresponding to the bar code is located to rotate to the pick-and-place position by means of the pick-and-place position sensor unit;
controlling the friction roller pick-and-place transfer unit to take the friction roller out from the given one of the plurality of brackets and place the friction roller in the friction roller feeding area;
reading the bar code on the friction roller to confirm its identity via a bar code scanner of the apparatus; and
controlling the cylinder driving unit to drive the plurality of brackets, and cause a specified bracket of the plurality of brackets to rotate back to a cylinder origin position by means of an origin position sensor unit of the apparatus.

* * * * *